United States Patent
Aminaka et al.

(10) Patent No.: US 10,588,023 B2
(45) Date of Patent: Mar. 10, 2020

(54) RADIO COMMUNICATION SYSTEM, BASE STATION, MOBILE STATION, COMMUNICATION CONTROL METHOD, AND COMPUTER READABLE MEDIUM

(71) Applicant: NEC Corporation, Tokyo (JP)

(72) Inventors: Hiroaki Aminaka, Tokyo (JP); Hisashi Futaki, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 15/658,987

(22) Filed: Jul. 25, 2017

(65) Prior Publication Data

US 2017/0325276 A1 Nov. 9, 2017

Related U.S. Application Data

(63) Continuation of application No. 14/432,874, filed as application No. PCT/JP2013/003240 on May 21, 2013, now Pat. No. 9,750,069.

(30) Foreign Application Priority Data

Oct. 5, 2012 (JP) .................................. 2012-223176

(51) Int. Cl.
*H04W 16/14* (2009.01)
*H04W 76/12* (2018.01)
(Continued)

(52) U.S. Cl.
CPC ....... *H04W 16/14* (2013.01); *H04W 72/0406* (2013.01); *H04W 72/0453* (2013.01);
(Continued)

(58) Field of Classification Search
None
See application file for complete search history.

(56) References Cited

U.S. PATENT DOCUMENTS

2012/0076120 A1* 3/2012 Kovvali ............... H04W 76/11
370/338
2012/0218966 A1 8/2012 Yamazaki et al.
(Continued)

FOREIGN PATENT DOCUMENTS

CN 102668608 A 9/2012
EP 2 498 571 A1 9/2012
(Continued)

OTHER PUBLICATIONS

Chinese Office Action issued by the State Intellectual Property Office of the People's Republic of China for Chinese Application No. 201380052402.X dated Sep. 4, 2017 (21 pages).
(Continued)

*Primary Examiner* — Diane L Lo
(74) *Attorney, Agent, or Firm* — Wilmer Cutler Pickering Hale and Dorr LLP

(57) ABSTRACT

A first base station (1) is configured to establish a first signaling bearer with a mobility management apparatus (5), establish a second signaling bearer with a second base station (2), and to establish a signaling radio bearer with a mobile station (3) in a first cell (10). The second base station (2) is configured to establish the second signaling bearer with the first base station (1), establish a data bearer with a data transfer apparatus (6), and to establish a data radio bearer with the mobile station (3) in a second cell (20). Furthermore, the first base station (1) is configured to transmit, to the second base station (2) through the second signaling bearer configuration information, necessary to establish the data bearer and the data radio bearer in the second base station (2). Thus, for example, bearer architecture suitable for a C/U plane split scenario is provided.

19 Claims, 16 Drawing Sheets

(51) Int. Cl.
*H04W 76/15* (2018.01)
*H04W 72/04* (2009.01)
*H04W 16/32* (2009.01)
*H04W 92/14* (2009.01)
*H04W 92/20* (2009.01)

(52) U.S. Cl.
CPC .......... *H04W 76/12* (2018.02); *H04W 76/15* (2018.02); *H04W 16/32* (2013.01); *H04W 92/14* (2013.01); *H04W 92/20* (2013.01)

(56) References Cited

U.S. PATENT DOCUMENTS

| | | | | |
|---|---|---|---|---|
| 2012/0314689 | A1* | 12/2012 | Wang | H04W 36/12 370/331 |
| 2013/0155948 | A1 | 6/2013 | Pinheiro et al. | |
| 2014/0016614 | A1 | 1/2014 | Velev et al. | |
| 2014/0187245 | A1* | 7/2014 | Xu | H04W 36/0016 455/436 |
| 2015/0312957 | A1* | 10/2015 | Pelletier | H04W 74/04 370/329 |

FOREIGN PATENT DOCUMENTS

| | | |
|---|---|---|
| JP | 2006-287601 A | 10/2006 |
| JP | 2014-039124 A | 2/2014 |
| JP | 2014-523199 A | 9/2014 |
| KR | 10-2006-0130489 A | 12/2006 |
| WO | WO-2011/052774 A1 | 5/2011 |
| WO | WO-2011/142624 A2 | 11/2011 |

OTHER PUBLICATIONS

International Search Report corresponding to PCT/JP2013/003240, dated Aug. 27, 2013 (3 pages).

3GPP RWS-120010, NTT Docomo, "Requirements, Candidate Solutions & Technology Roadmap for LTE Rel-12 Onward," 3GPP TSG RAN Workshop on Rel-12 and Onwards Ljubljana, Slovenia, Jun. 11-12, 2012 (27 pages).

Anass Benjebbour, et al., "Conceptual Views and Radio Access Technologies for Future Evolution of LTE-A," IEICE Technical Report, Musen Tsushin System (RCS2012-100), Aug. 30-31, 2012, vol. 112, No. 192, (pp. 25-30).

Korean Notice of Preliminary Rejection issued in corresponding Korean Application No. 10-2015-7008773, dated Apr. 8, 2016, 11 pages.

Zhaojun Li, et al. "User Plane and Control Plane Separation Framework for Home Base Stations", Journal of Fujitsu Science Technology, vol. 46, No. 1, Jan. 2010, pp. 79-86.

Japanese Office Action issued by the Japan Patent Office for Japanese Application No. 2014539578 dated May 9, 2017 (7 pages).

* cited by examiner

RADIO COMMUNICATION SYSTEM, BASE STATION, MOBILE STATION, COMMUNICATION CONTROL METHOD, AND COMPUTER READABLE MEDIUM

CROSS-REFERENCE TO RELATED APPLICATIONS

The present application is a continuation of U.S. patent application Ser. No. 14/432,874 entitled "Radio Communication System, Base Station, Mobile Station, Communication Control Method, and Computer Readable Medium," filed on Apr. 1, 2015, a national stage application of International Application No. PCT/JP2013/003240, filed on May 21, 2013, which claims the benefit of priority from Japanese Patent Application No. JP2012-223176, filed on Oct. 5, 2012, the disclosures of each of which are incorporated herein in their entirety by reference thereto.

TECHNICAL FIELD

The present invention relates to a radio communication system and, in particular, to network architecture in a C/U plane split scenario.

BACKGROUND ART

In Long Term Evolution (LTE) Release 12 in 3rd Generation Partnership Project (3GPP), "local area enhancement" or "small cell enhancement" has become one of subjects for discussion for accommodation of local huge traffic, improvement of throughput, efficient utilization of a high frequency band, and the like (refer to Non-patent Literature 1). In the local area enhancement or the small cell enhancement, a low-power node (LPN) that forms a small cell is used.

Furthermore, a C/U plane split scenario has been proposed regarding the small cell enhancement. In C/U-plane split, a macro cell provides a control plane (e.g., a Radio Resource Control (RRC) connection and a Non-Access Stratum (NAS) message transfer) to a mobile station (User Equipment (UE)), and the small cell provides a user plane to the UE. When looking at a specific introduction example regarding a Control plane (C-plane), the macro cell can maintain a good connection with the UE by a wide coverage using a low frequency band, and can support mobility of the UE. Meanwhile, when looking at the user plane (U-plane), the small cell can provide local high throughput to the UE by using a wide bandwidth in a high frequency band.

In the C/U plane split scenario, a case is also assumed where the small cell need not transmit existing cell-specific signals/channels, for example, a PSS (Primary Synchronization Signal), a Secondary Synchronization Signal (SSS), a Cell-specific Reference Signal (CRS), a Master Information Block (MIB), and a System Information Block (SIB). Accordingly, such new small cell may be called a phantom cell. In addition, a base station (eNB) or an LPN that provides such small cell may also be called a Phantom eNodeB (PhNB).

CITATION LIST

Non Patent Literature

[Non-Patent Literature 1] 3GPP RWS-120010, NTT DOCOMO, "Requirements, Candidate Solutions & Technology Roadmap for LTE Rel-12 Onward", 3GPP TSG RAN Workshop on Rel-12 and Onwards Ljubljana, Slovenia, 11-12 Jun. 2012

SUMMARY OF INVENTION

Technical Problem

As mentioned above, there has been proposed the C/U plane split scenario that provides the C-plane to the UE in a cell controlled by an MeNB and provides the U-plane to the UE in a cell controlled by the LPN. The present inventors have examined bearer architecture suitable for the C/U plane split scenario. Accordingly, one of objects of the present invention is to provide bearer architecture suitable for the C/U plane split scenario.

Solution to Problem

In a first aspect, a radio communication system includes a first base station that operates a first cell, a second base station that operates a second cell, and a mobile station. The first base station is configured to establish a first signaling bearer with the mobility management apparatus, establish a second signaling bearer with the second base station, and to establish a signaling radio bearer with the mobile station in the first cell. The second base station is configured to establish the second signaling bearer with the first base station, establish a data bearer with a data transfer apparatus, and to establish a data radio bearer with the mobile station in the second cell. The first base station is further configured to transmit, to the second base station through the second signaling bearer, configuration information necessary to establish the data bearer and the data radio bearer in the second base station.

In a second aspect, a first base station includes a radio communication unit that operates a first cell, and a control unit. The control unit performs control so as to establish a first signaling bearer with a mobility management apparatus in a core network, establish a second signaling bearer with a second base station that operates a second cell, and so as to establish a signaling radio bearer with a mobile station in the first cell. Furthermore, the control unit is configured to transmit, to the second base station through the second signaling bearer, configuration information necessary to establish a data bearer and a data radio bearer in the second base station. Here, the data bearer is established between a data transfer apparatus in the core network and the second base station. The data radio bearer is established between the second base station and the mobile station in the second cell.

In a third aspect, a mobile station is used in combination with the radio communication system according to the above-mentioned first aspect, and the mobile station includes a radio communication unit and a control unit. The control unit receives configuration information of the data radio bearer from the first base station, and controls the radio communication unit so as to receive or transmit user data through the second cell.

In a fourth aspect, a communication control method, in a first base station that operates a first cell, includes: (a) performing control so as to establish a first signaling bearer with a mobility management apparatus in a core network, establish a second signaling bearer with a second base station that operates a second cell, and so as to establish a signaling radio bearer with a mobile station in the first cell; and (b) transmitting, to the second base station through the second signaling bearer, configuration information necessary to establish a data bearer and a data radio bearer in the second base station. Here, the data bearer is established between a data transfer apparatus in the core network and the second base station. The data radio bearer is established between the second base station and the mobile station in the second cell.

In a fifth aspect, a program includes instructions for causing a computer to perform the communication control method according to the fourth aspect mentioned above.

Advantageous Effects of Invention

According to the above-mentioned aspects, bearer architecture suitable for the C/U plane split scenario is provided.

DESCRIPTION OF EMBODIMENTS

Hereinafter, specific exemplary embodiments may be explained in detail with reference to the drawings. The same or corresponding elements are denoted by the same reference symbols throughout the drawings, and repetitive explanations will be omitted as necessary for the sake of clarity.

First Embodiment

Figure 1:
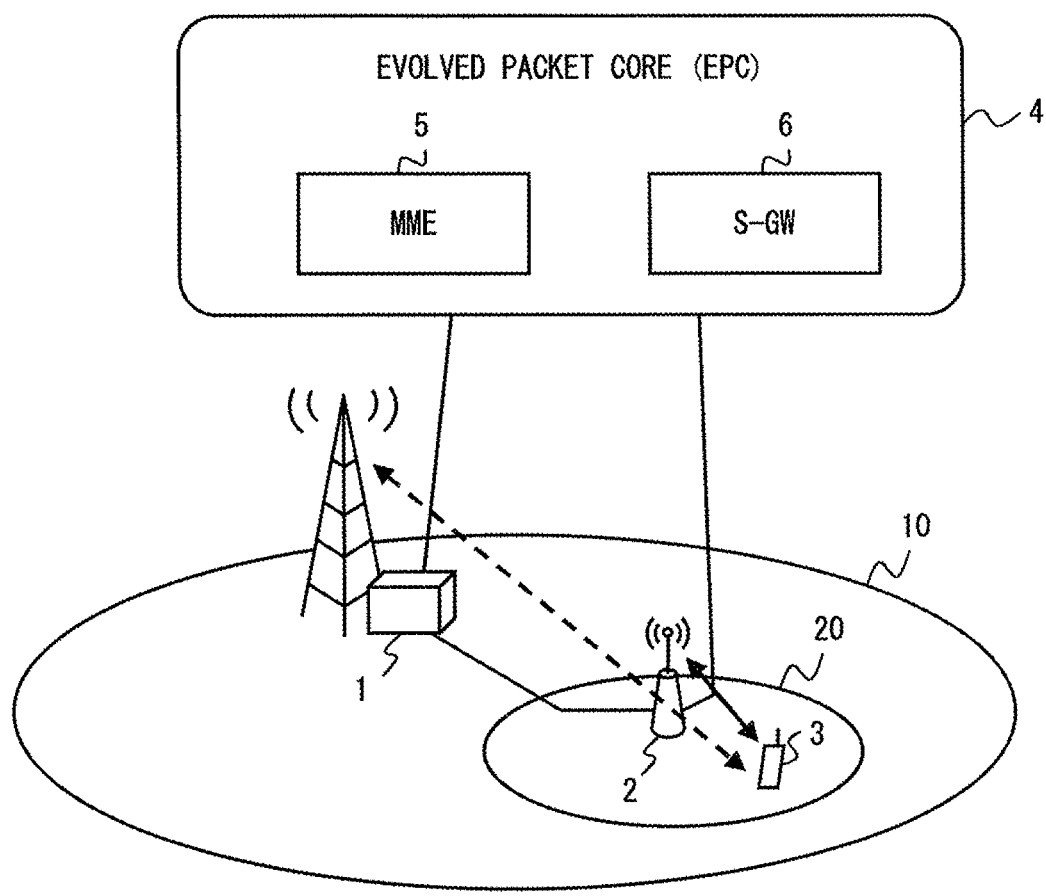
FIG. 1 is a diagram showing a configuration example of a radio communication system (e.g., an LTE system) according to a first embodiment.

FIG. 1 shows a configuration example of a radio communication system according to the embodiment. The radio communication system according to the embodiment includes a first base station 1, a second base station 2, a mobile station 3, and a core network 4. The base stations 1 and 2 operate a first cell 10 and a second cell 20, respectively. The cells 10 and 20 are typically operated in different frequency bands (e.g., a 2 GHz band and a 3.5 GHz band). The core network 4 includes a mobility management apparatus 5 and a data transfer apparatus 6. Hereinafter, for the sake of simplicity of explanation, a case will be explained as an example where the radio communication system is an LTE system. Accordingly, the first base station 1 corresponds to an MeNB, the second base station 2 to an LPN, the mobile station 3 to UE, the core network 4 to an Evolved Packet Core (EPC), the mobility management apparatus 5 to a Mobility Management Entity (MME), and the data transfer apparatus 6 to a Serving Gateway (S-GW).

The radio communication system according to the embodiment applies C/U-plane split to the cells 10 and 20. Specifically, the LPN 2 provides U-plane service to the UE 3 in the cell 20. In other words, the LPN 2 establishes a Data Radio bearer (DRB) with the UE 3, and transfers user data of the UE 3. The MeNB 1 provides C-plane service in the cell 10 with respect to the UE 3 that establishes the DRB with the LPN 2. In other words, the MeNB 1 establishes a Signaling Radio Bearer (SRB) with the UE 3, and provides RRC signaling to establish and modify the DRB with the LPN 2 in the cell 20, NAS message transfer between the EPC 4 and the UE 3, and the like. In addition, the MeNB 1 may transmit master information (e.g., a system bandwidth and the number of transmission antennas) and system information (e.g., parameters regarding the DRB in the cell 20), which are related to the cell 20 of the LPN 2, using a downlink channel (e.g., a Physical Broadcast Channel (PBCH) or a Physical Downlink Shared Channel (PDSCH)) of the cell 10.

Note that the MeNB 1 need not provide all the C-plane service regarding the UE 3. For example, the LPN 2 may perform control related to a layer 1 (physical layer) and a layer 2 (Media Access Control (MAC) sublayer and Radio Link Control (RLC) sublayer). Specifically, the LPN 2 may receive layer 1/layer 2 control signals (e.g., a Hybrid Automatic Repeat Request (H-ARQ) ACK, a Channel Quality Indicator (CQI), a Precoding Matrix Indicator (PMI), and a Rank Indicator (RI) using an uplink control channel (e.g., a Physical Uplink Control Channel (PUCCH)) or an uplink data channel (e.g., a Physical Uplink Shared Channel (PUSCH)). Further or alternatively, the LPN may transmit, to the UE 3 on a downlink control channel (e.g., a Physical Downlink Control Channel (PDCCH)), downlink scheduling information, an ACK/NACK to uplink transmission, and the like.

The EPC 4 is a network managed by an operator that mainly provides mobile communication service. The EPC 4 has: control plane (C-plane) functions including mobility management (e.g., location registration and location update) and bearer management (e.g., establishment, modification, and release of a bearer) of the UE 3; and user plain (U-plane) functions including transferring the user data of the UE 3 between the MeNB 1 and an external network (not shown)

and between the LPN 2 and the external network. The MME 5 contributes to the C-plane functions in the EPC. The S-GW 6 contributes to the U-plane functions in the EPC. The S-GW 6 is arranged at a boundary between the EPC 4 and a Radio Access Network (RAN) including the MeNB 1 and the LPN 2.

Figure 2:
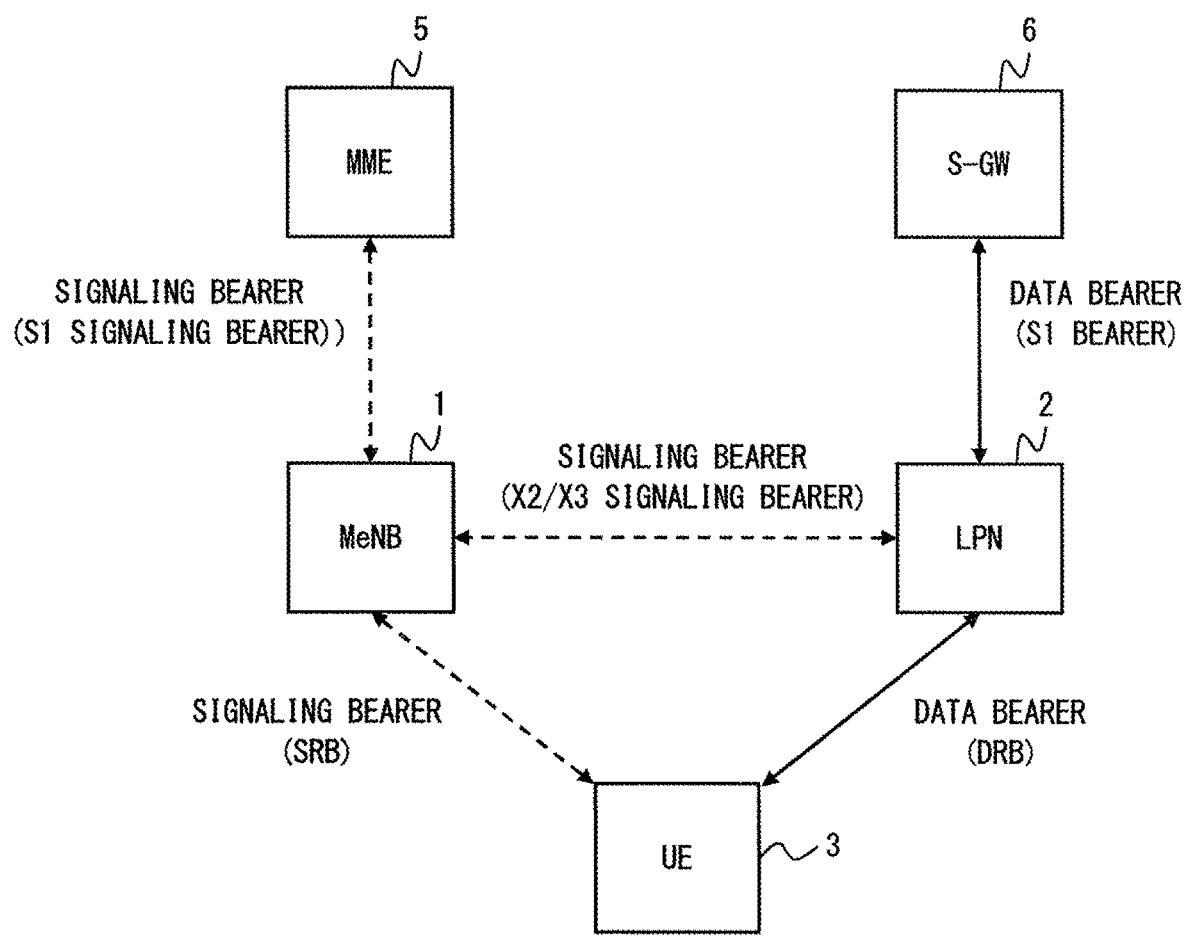
FIG. 2 is a diagram showing bearer architecture in the radio communication system according to the first embodiment.

Bearer architecture according to the embodiment will be explained herebelow with reference to FIG. 2. FIG. 2 shows bearer architecture related to user data transfer on the cell 20. As has been described with regard to the radio bearers, the MeNB 1 establishes the SRB with the UE 3, and provides the C-plane service including the RRC signaling, for example, to establish and modify the DRB in the cell 20, and the NAS message transfer between the EPC 4 and the UE 3. Meanwhile, the LPN 2 establishes the DRB with the UE 3 to transmit and receive the user data of the UE 3.

Next, bearers between the EPC 4 and the MeNB 1 and between the EPC 4 and the LPN 2 will be explained. A signaling bearer (i.e., an S1 signaling bearer using an S1-MME interface) with the EPC 4 is established between the MME 5 and the MeNB 1. The MeNB 1 establishes the S1 signaling bearer with the MME 5, and transmits and receives S1 Application Protocol (S1-AP) messages to and from the MME 5. Meanwhile, a data bearer (i.e., an S1 bearer using an S1-U interface) with the EPC 4 is established between the S-GW 6 and the LPN 2. The LPN 2 establishes the S1 bearer with the S-GW 6, and transmits and receives user data of the UE 3 to and from the S-GW 6.

Furthermore, the MeNB 1 establishes a signaling bearer with the LPN 2. The signaling bearer between the MeNB 1 and the LPN 2 is, for example, established using an X2 interface. The X2 interface is an inter-eNB interface. Note that a case can be considered where the LPN 3 is defined as a new node, and where a new interface different from the X2 interface is defined between the eNB and the LPN. In this case, the signaling bearer between the MeNB 1 and the LPN 2 may be established using the new interface. This new interface is temporarily called an X3 interface in the specification. The MeNB 1 is configured to transmit, to the LPN 2 through an X2/X3 signaling bearer, bearer configuration information (hereinafter called "E-UTRAN Radio Access Bearer (E-RAB) configuration information") necessary to establish the S1 bearer with the S-GW 6 and the DRB with the UE 3 in the LPN 2. Note that the E-RAB is a radio access bearer including the S1 bearer and the DRB.

According to the above-mentioned bearer architecture, the LPN 2 can set the S1 bearer and the DRB based on the E-RAB configuration information given from the MeNB 1 without needing an S1 signaling bearer with the MME 5. In addition, in the above-mentioned bearer architecture, the termination point of the S1 bearer (i.e., an S1-U bearer) is different from the termination point of the S1 signaling bearer. That is, the LPN 2 terminates the S1 bearer instead of the MeNB 1. In other words, in the architecture of FIG. 2, C/U planes are separated not only with regard to signaling in the RAN but also with regard to interfaces between the EPC 4 and the RAN. As a result of this, the MeNB 1 is only required to perform signaling for establishing the DRB and the S1 bearer necessary for the UE 3 to transmit and receive the user data via the cell 20 and the LPN 2. In other words, the MeNB 1 need not terminate the S1 bearer (i.e., a PRS Tunneling Protocol (GTP) tunnel) for communication of the UE 3 through the cell 20, and also need not perform forwarding of user data packets between the S1 bearer and the DRB. These processes are performed by the LPN 2. Accordingly, a processing load of the MeNB 1 can be reduced.

Figure 3:
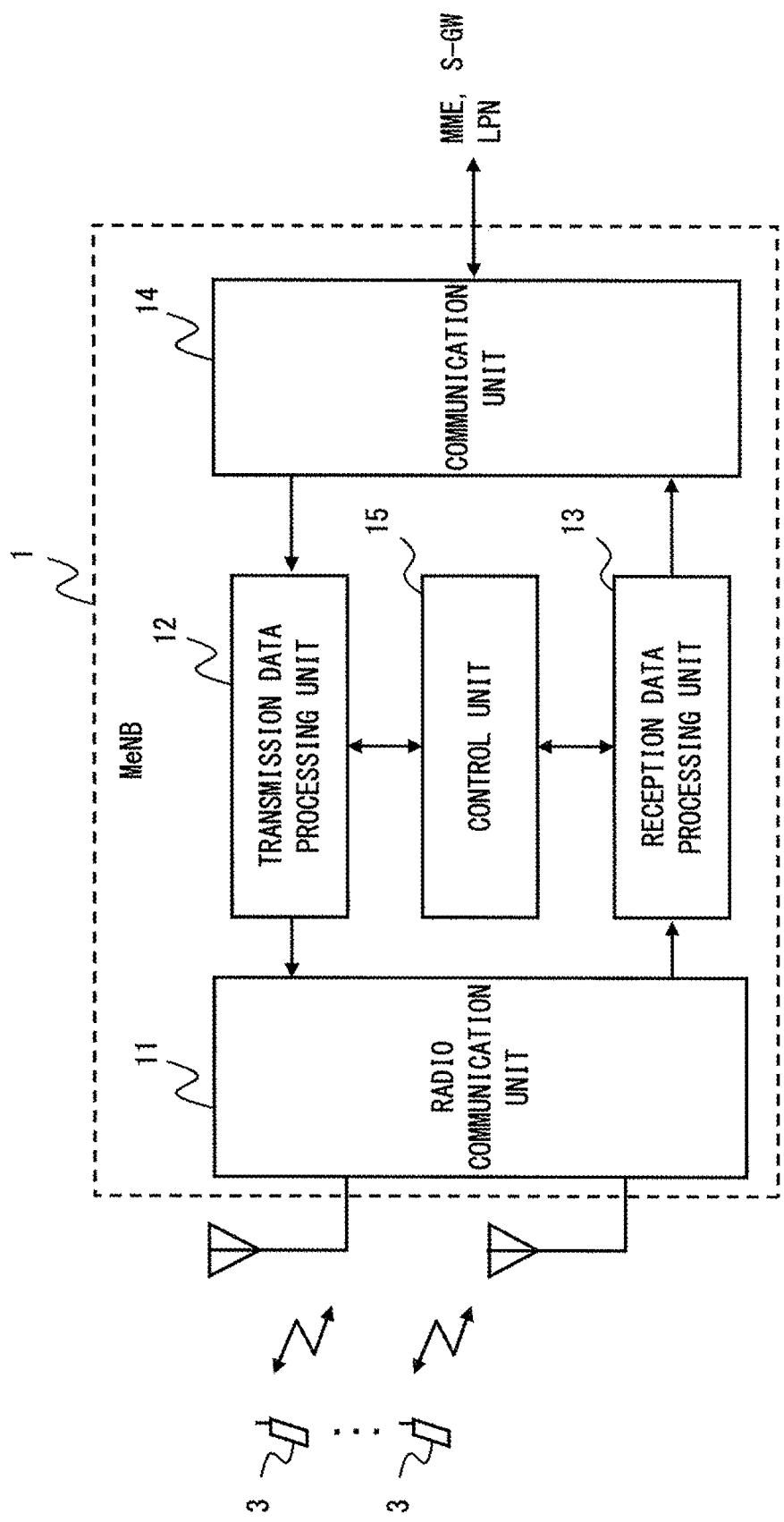
FIG. 3 is a diagram showing a configuration example of a first base station (e.g., an MeNB) according to the first embodiment.

Configuration examples of the MeNB 1, the LPN 2, the UE 3, the MME 5, and the S-GW 6 according to the embodiment will be explained herebelow. FIG. 3 is a block diagram showing a configuration example of the MeNB 1. A radio communication unit 11 receives an uplink signal transmitted from the UE 3 through an antenna. A reception data processing unit 13 restores the received uplink signal. The obtained reception data is transferred to other network node, for example, the MME 5 or the S-GW 6 via a communication unit 14. For example, uplink user data received from the UE 3 via the cell 10 is transferred to the S-GW 6. Meanwhile, NAS data among control data received from the UE 3 is transferred to the MME 5. Furthermore, the reception data processing unit 13 receives from a control unit 15 the control data to be transmitted to the LPN 2 or the MME 5, and transmits it to the LPN 2 or the MME 5 via the communication unit 14.

A transmission data processing unit 12 acquires from the communication unit 14 user data destined for the UE 3, and generates a transport channel by performing error correction coding, rate matching, interleaving, and the like, on the user data. The transmission data processing unit 12 then generates a transmission symbol sequence by adding control information to the data sequence of the transport channel. The radio communication unit 11 generates a downlink signal by performing carrier modulation based on the transmission symbol sequence, frequency conversion, signal amplification, and the like, and transmits the generated signal to the UE 3. Furthermore, the transmission data processing unit 12 receives from the control unit 15 control data to be transmitted to the UE 3, and transmits it to the UE 3 via the radio communication unit 11.

The control unit 15 performs signaling with the MME 5, the LPN 2, and the UE 3 through the signaling bearers in order to enable the UE 3 to receive or transmit the user data through the cell 20 operated by the LPN 2. Specifically, the control unit 15 transmits an establishment request of the E-RAB or the S1 bearer to the MME 5 through the S1 signaling bearer. Furthermore, the control unit 15 transmits, to the LPN 2 through the X2/X3 signaling bearer, the E-RAB configuration information necessary to establish the S1 bearer and the DRB in the LPN 2. Still furthermore, the control unit 15 transmits, to the UE 3 through the SRB in the cell 10, DRB configuration information necessary to establish the DRB on the cell 20 in the UE 3.

Figure 4:
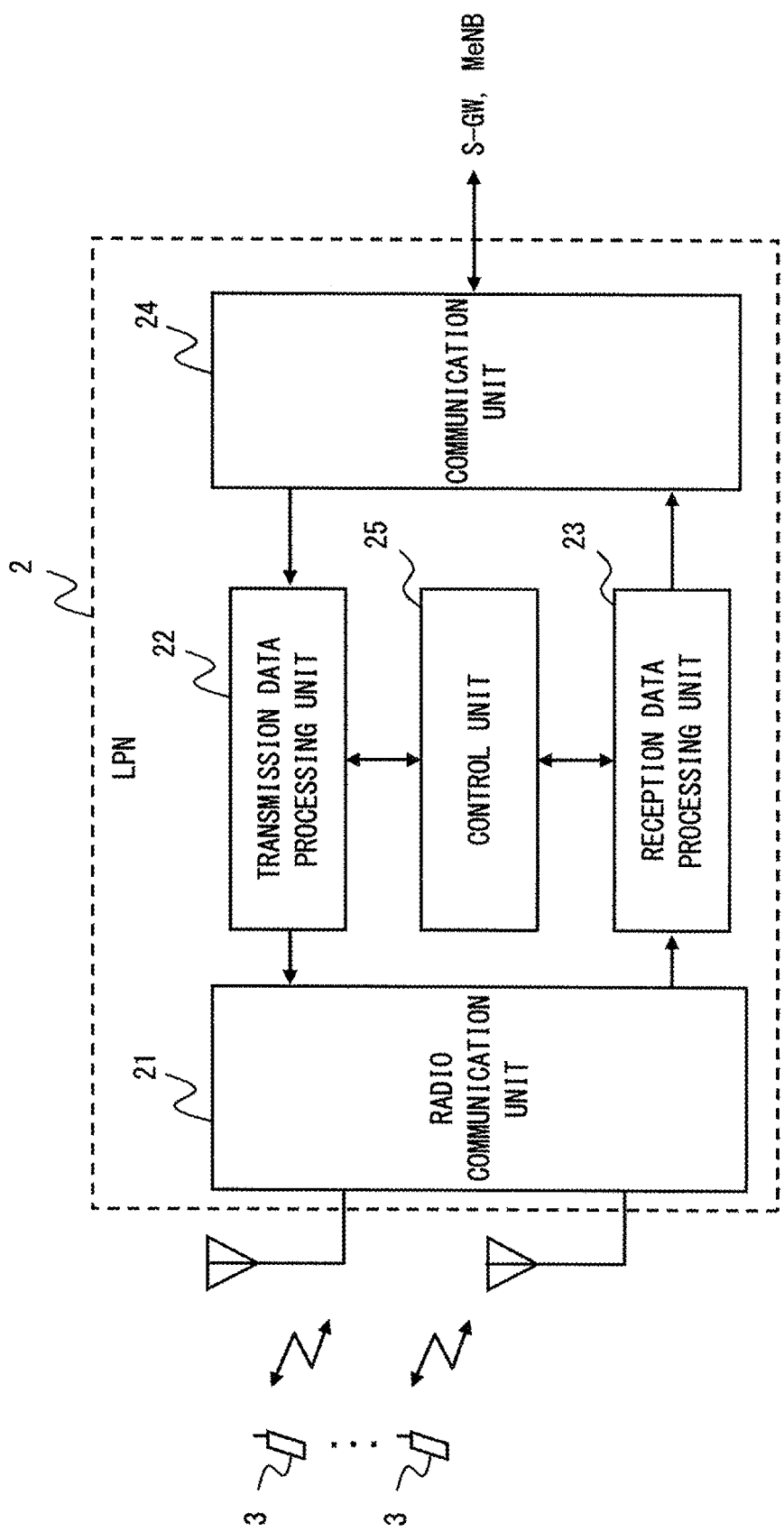
FIG. 4 is a diagram showing a configuration example of a second base station (e.g., an LPN) according to the first embodiment.

FIG. 4 is a block diagram showing a configuration example of the LPN 2. The functions and operations of a radio communication unit 21, a transmission data processing unit 22, a reception data processing unit 23, and a communication unit 24 shown in FIG. 4 are similar to those of the corresponding elements of the base station 1 shown in FIG. 3, i.e., the radio communication unit 11, the transmission data processing unit 12, the reception data processing unit 13, and the communication unit 14.

A control unit 25 of the LPN 2 receives the E-RAB configuration information from the MeNB 1 (control unit 15) through the X2/X3 signaling bearer, and sets the S1 bearer with the S-GW 6 and the SRB with the UE 3 in accordance with the E-RAB configuration information.

Figure 5:
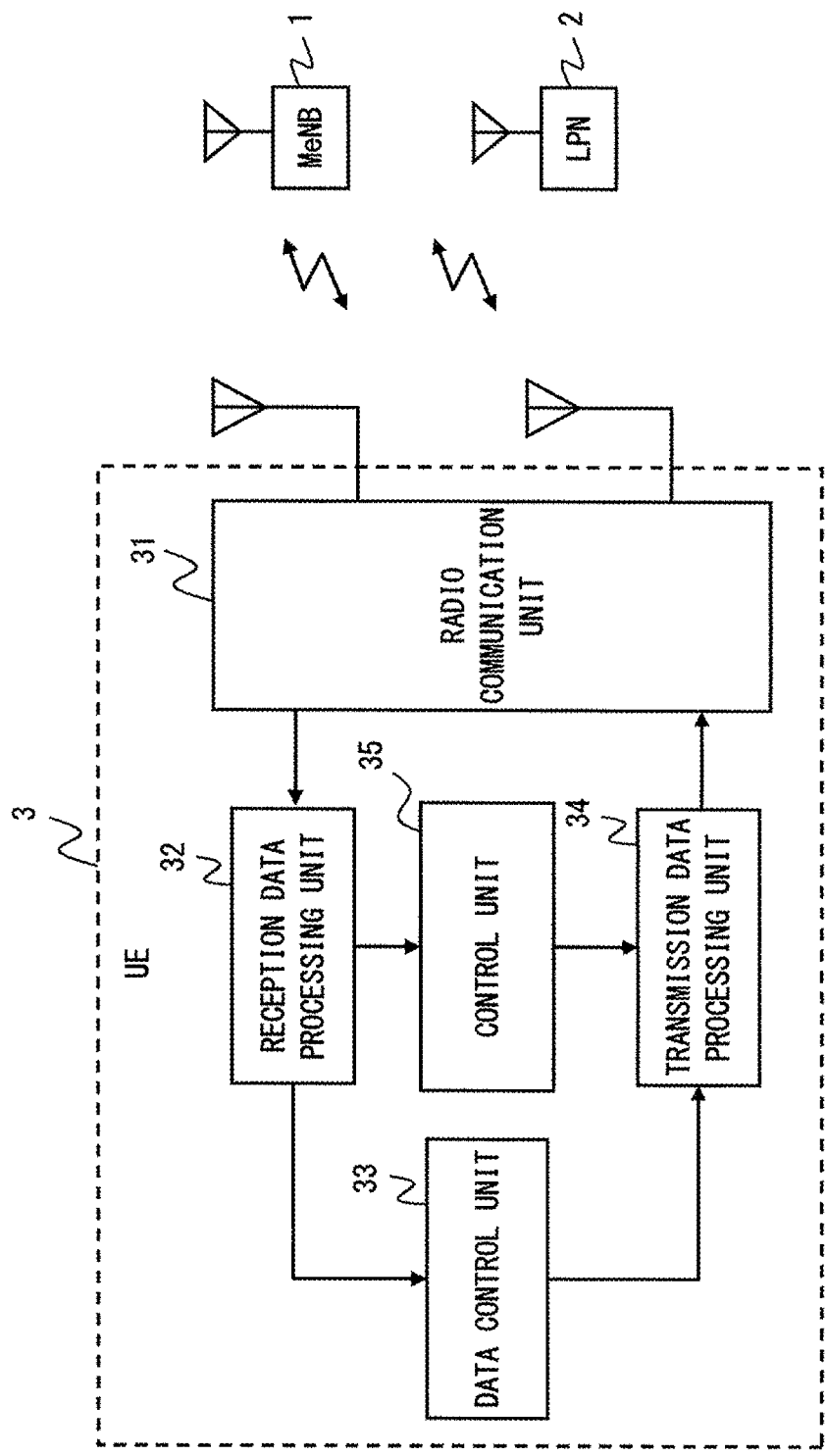
FIG. 5 is a diagram showing a configuration example of a mobile station (e.g., a UE) according to the first embodiment.

FIG. 5 is a block diagram showing a configuration example of the UE 3. A radio communication unit 31 can communicate with both the cells 10 and 20. In addition, the radio communication unit 31 may support carrier aggregation of a plurality of cells operated by different eNBs. In this case, the radio communication unit 31 can simultaneously use the plurality of cells 10 and 20 for transmission or reception of user data. The radio communication unit 31 receives downlink signals from one or both of the eNB1 and the LPN 2 via an antenna. A reception data processing unit 32 restores reception data from the received downlink signals, and sends the reception data to a data control unit 33. The data control unit 33 uses the reception data according to the purpose thereof. A transmission data processing unit 34 and the radio communication unit 31 generate an uplink signal using transmission data supplied from the data control unit 33, and transmit the uplink signal toward one or both of the eNB1 and the LPN 2.

A control unit 35 of the UE 3 controls the radio communication unit 31 so as to establish the SRB with the MeNB 1 on the cell 10. Additionally, the control unit 35 receives from the MeNB 1 the DBB configuration information for establishing the DRB with the LPN 2, and controls the radio communication unit 31 so as to receive or transmit the user data through the cell 20. Thus, the U3 can communicate with the LPN 2 through the DRB based on signaling with the MeNB 1.

Figure 6:
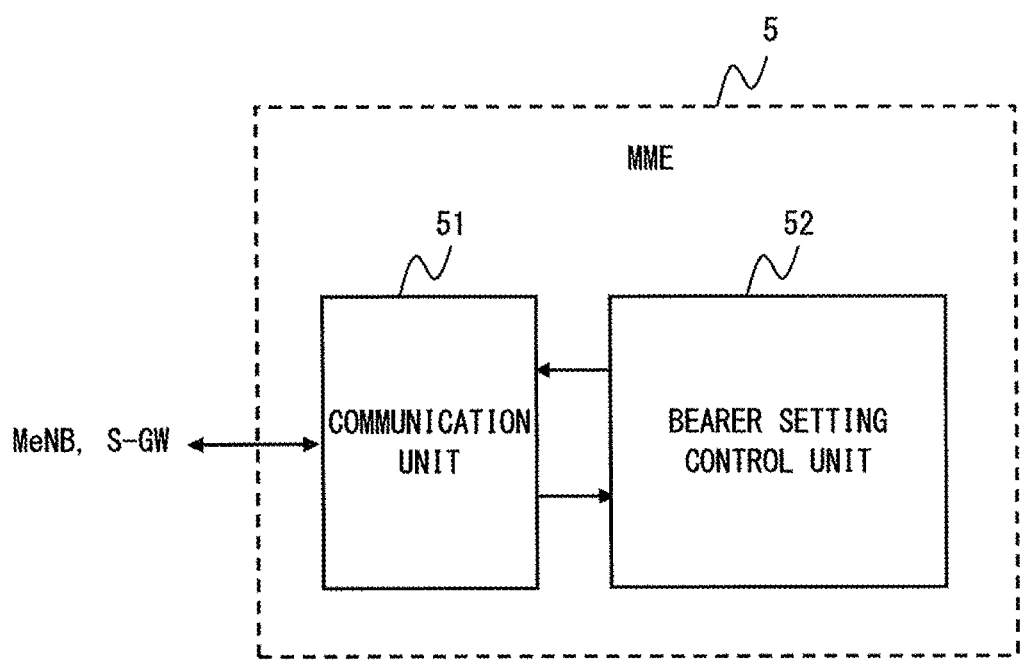
FIG. 6 is a diagram showing a configuration example of a mobility management apparatus (e.g., an MME) according to the first embodiment.

FIG. 6 is a block diagram showing a configuration example of the MME 5. A communication unit 51 communicates with the MeNB 1 and the S-GW 6. A bearer setting control unit 52 communicates with the MeNB 1 and the S-GW 6 through the communication unit 51, and controls setting of the signaling bearer or the data bearer in these apparatuses. Specifically, in response to receiving a setting request of the data bearer (the E-RAB or the S1 bearer) from the base station 1 or 2, the bearer setting control unit 52 requests S1 bearer setting of the S-GW 6, and transmits to the MeNB 1 the bearer configuration information related to the E-RAB or the S1 bearer.

Figure 7:
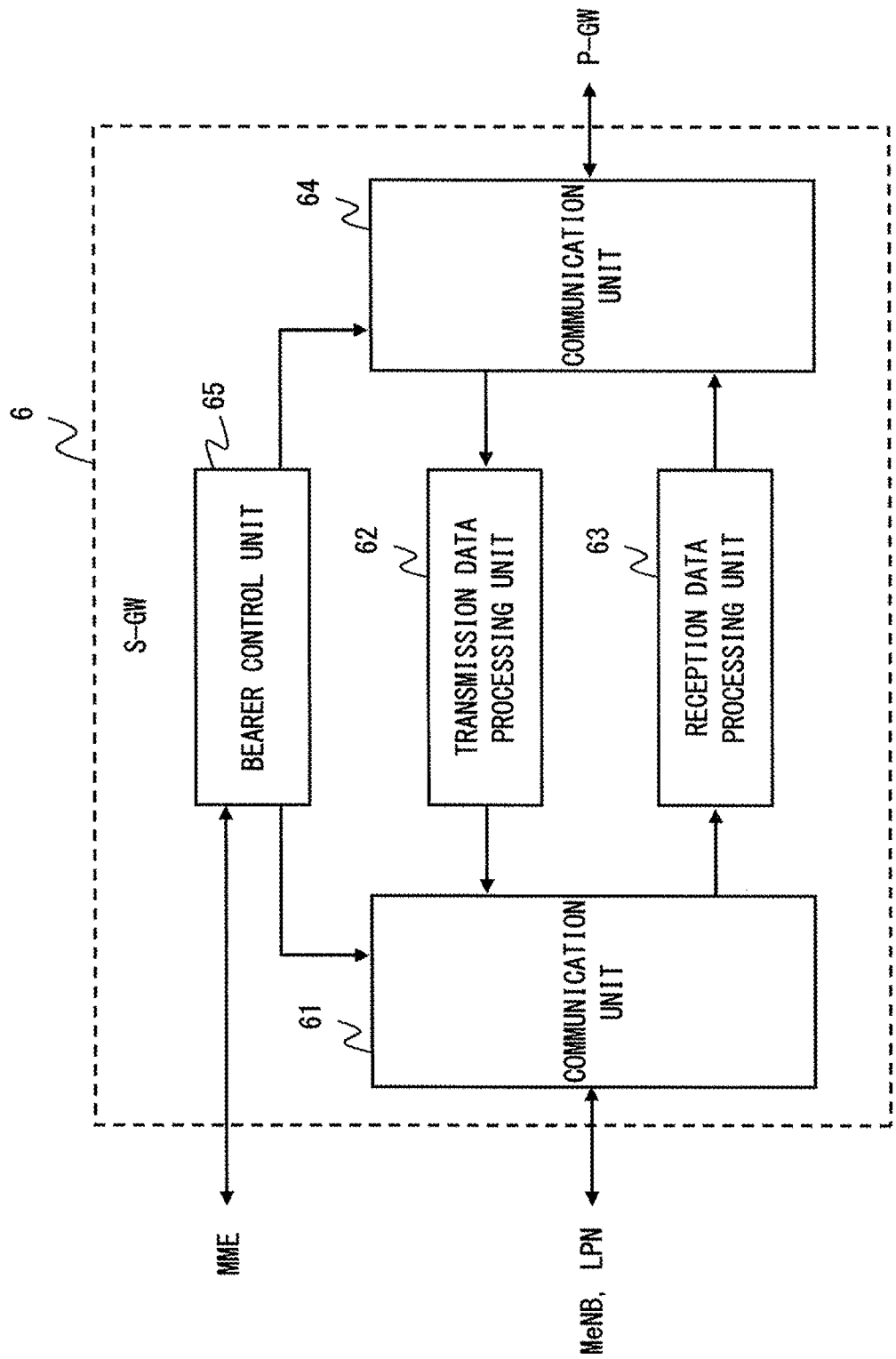
FIG. 7 is a diagram showing a configuration example of a data transfer apparatus (e.g., an S-GW) according to the first embodiment.

FIG. 7 is a block diagram showing a configuration example of the S-GW 6. A communication unit 61 establishes the S1 bearer with the LPN 2, and transmits or receives user data to or from the LPN 2 through the S1 bearer. The communication unit 61 may establish an S1 bearer with the MeNB 1 for reception or transmission of the user data through the cell 10 by the UE 3. A communication unit 64 sets an S5/S8 bearer with a Packet Data Network Gateway (P-GW) in the EPC 4, and transmits and receives user data to and from other data transfer apparatus.

A transmission data processing unit 62 receives downlink user data destined for the UE 3 from the communication unit 64, and forwards the downlink user data to the S1 bearer based on mapping between the upstream side S5/S8 bearer and the downstream side S1 bearer. A reception data processing unit 63 receives uplink user data from the communication unit 61, and forwards the uplink user data to the S5/S8 bearer based on the mapping between the S5/S8 bearer and the S1 bearer.

A bearer control unit 65 communicates with the MME 5, and sets the S1 bearer between the LPN 2 and the communication unit 61 in accordance with control of the MME 5.

Figure 8:
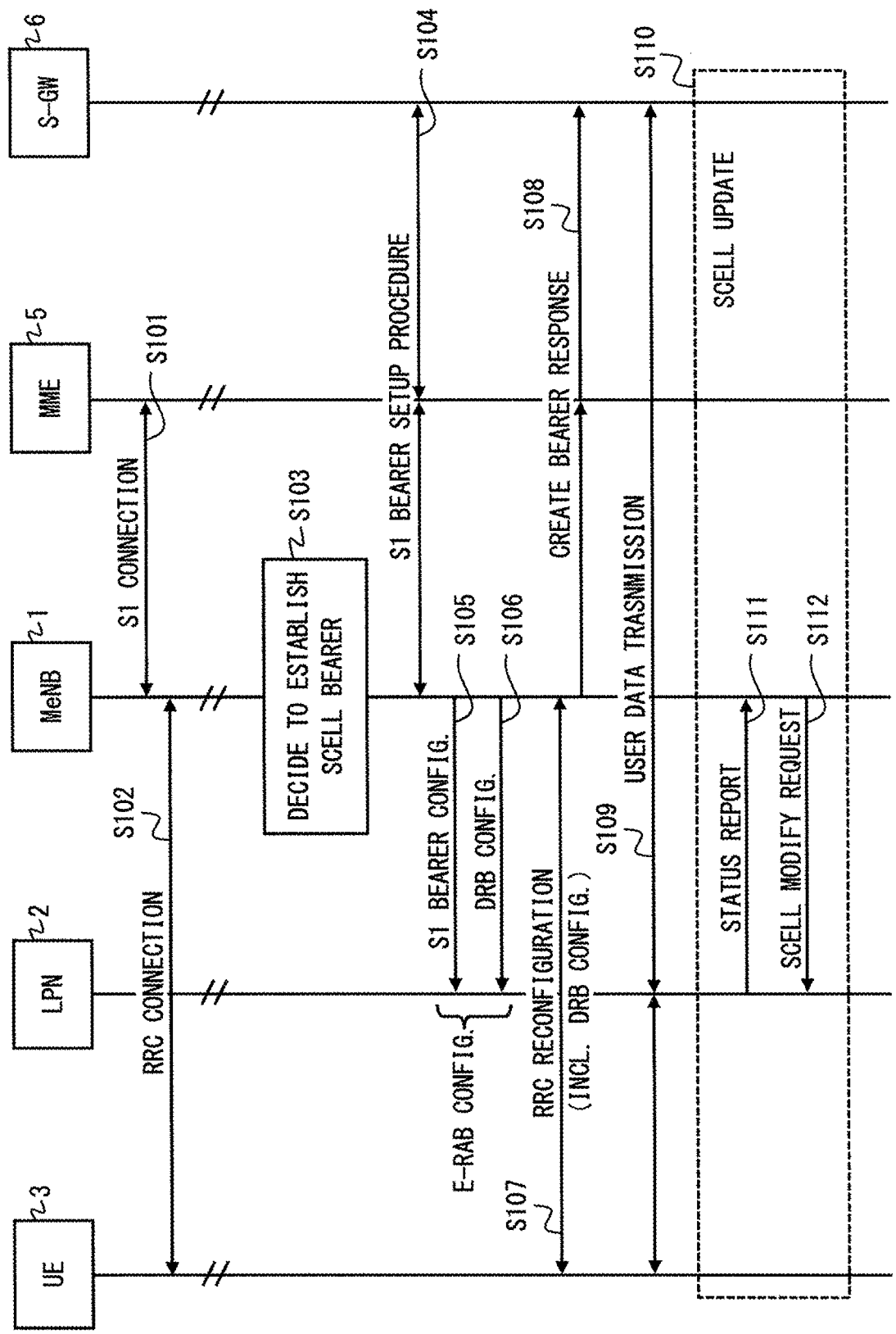
FIG. 8 is a sequence diagram showing an establishment procedure of data bearers according to the first embodiment.

There will be explained a specific example of a procedure to establish the DRB and the S1 bearer that go through the LPN 2 for communication of the UE 3 in the cell 20. FIG. 8 is a sequence diagram showing an establishment procedure of the data bearers according to the embodiment. In step S101, the MeNB 1 establishes an S1 connection associated with the UE 3 with the MME 5 for the UE 3 belonging to the cell 10. That is, the MeNB 1 establishes the S1 signaling bearer with the MME 5 on the S1-MME interface. In step S102, the MeNB 1 establishes an RRC connection with the UE 3 on the cell 10.

In steps S103 to S108, establishment processing of the DRB and the S1 bearer that go through the LPN 2 is performed. In step S103, the MeNB 1 determines setting of the data bearer in a secondary cell (SCell). Here, the secondary cell denotes the cell 20 of the LPN 2. It can also be said that the MeNB 1 determines a setup of the secondary cell for the UE 3. The determination in step S103 can be made based on various conditions. For example, the MeNB 1 may determine the bearer setup in the cell 20 in response to a request from the UE 3 or a request from the EPC 4. Alternatively, the MeNB 1 may determine the bearer setup in the cell 20 in response to notification from the UE 3 indicating that the cell 20 can be used. Alternatively, the MeNB 1 may determine the bearer setup in the cell 20 according to an increased amount of the user data of the UE 3 in the cell 10. Alternatively, when the cell 10 has a high load, the MeNB 1 may determine the bearer setup in the cell 20 in order to offload traffic of the cell 10. Alternatively, the MeNB 1 may determine the bearer setup in the cell 20 in accordance with subscriber data (e.g., a category of the UE 3 or contract information) of the UE 3 received from a subscriber server (i.e., a Home Subscriber Server (HSS)) through the MME 5.

In step S104, the MeNB 1 transmits to the MME 5 the establishment request of the E-RAB, which goes through the LPN 2 for the UE 3. The MME 5 receives the request and starts a setting procedure of the S1 bearer. Specifically, the MME 5 requests the S-GW 6 to set the S1 bearer with the LPN 2. The S-GW 6 sets the S1 bearer with the LPN 2, and transmits to the MME 5 a response including an S1 bearer context (e.g., an address and a Tunnel Endpoint Identifier (TEID) of the S-GW 6 in the U-plane). The TEID indicates an endpoint in the S-GW 6 of a GTP tunnel as the S1 bearer. The MME 5 transmits to the MeNB 1 the E-RAB configuration information including the S1 bearer context.

In steps S105 and S106, the MeNB 1 transmits the E-RAB configuration information to the LPN 2 through the X2/X3 signaling bearer. The E-RAB configuration information includes S1 bearer configuration information and DRB configuration information. The LPN 2 sets the S1 bearer and the DRB in accordance with the E-RAB configuration information. The S1 bearer configuration information includes information necessary for establishing the S1 bearer with the S-GW 6. The S1 bearer configuration information, for example, includes an E-RAB ID, a Quality Class Indicator (QCI), an IP address of the S-GW 6, the TEID of the S-GW 6, a security key, and Temporary Mobile Subscriber Identity (TMSI). The DRB configuration information includes configuration information necessary for establishing the DRB with the UE 3. The DRB configuration information, for example, includes the E-RAB ID, a Quality Class Indicator (QCI), and configuration information of a physical layer and an MAC sublayer.

In step S107, the MeNB 1 transmits an RRC Reconfiguration message to the UE 3 using the SRB of the cell 10. The message includes the configuration information of the DRB in the cell 20. The UE 3 sets the DRB in accordance with the configuration information of the DRB.

In step S108, the MeNB 1 transmits to the MME 5 a message (CREATE BEARER RESPONSE) indicating setting completion of the E-RAB. The message includes configuration information of the LPN 2 (e.g., an address and a TEID of the LPN 2) regarding the S1 bearer. The MME 5 transmits to the S-GW 6 a message indicating the address and the TEID of the LPN 2. The S-GW 6 updates the S1 bearer configuration by the address and the TEID of the LPN 2 received from the MME 5.

The E-RAB that goes through the LPN 2 is set between the UE 3 and the S-GW 5 by the above processing of steps S103 to S108. In step S109, the UE 3 receives or transmits user data via the cell 20 and the LPN 2.

Step S110 of FIG. 8 shows one example of an update procedure of the secondary cell (i.e., the cell 20). For example, the MeNB 1 may deactivate the E-RAB (i.e., the DRB and the S1 bearer) for each UE 3 that goes through the LPN 2 or may stop utilizing the cell 20 based on a utilization status (e.g., a total traffic amount or the number of connected UEs) of the cell 20, a traffic amount (user data amount) for each UE 3 that is using the cell 20, or a combination thereof. For example, when communication of the UE 3 ends, or the traffic amount decreases, the MeNB 1 may deactivate the E-RAB of the UE 3. In addition, for example, when a load of the MeNB 1's cell 10 decreases, the MeNB 1 may deactivate all the E-RABs that go through the LPN 2, and may stop utilizing the cell 20. In the specific example shown in FIG. 8, the MeNB 1 receives a status report from the LPN 2 (step S111). The status report indicates a load (e.g., a total traffic amount, a radio resource utilization amount, a radio resource utilization rate, or the number of connected UEs) of the cell 20. In step S112, the MeNB 1 requests update (or modification) of the cell 20 based on the status report (SCell Modify Request).

Figure 9:
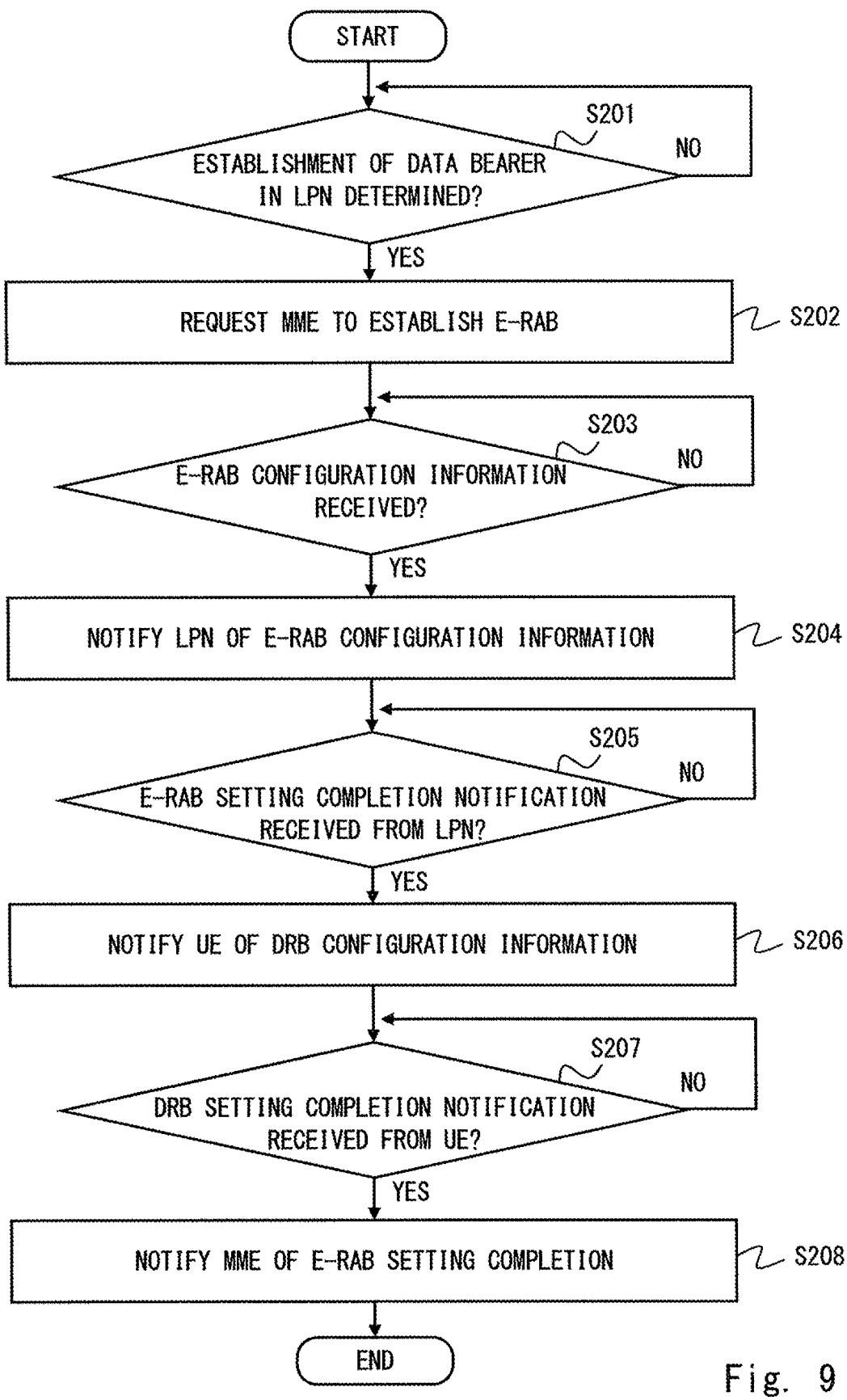
FIG. 9 is a flowchart showing an operation example of the first base station (e.g., an MeNB) according to the first embodiment.

FIG. 9 is a flowchart showing an operation example of the MeNB 1. In step S201, the MeNB 1 (control unit 15) determines establishment of the data bearer in the LPN 2 (or activation of the cell 20 of the LPN 2). In step S202, the MeNB 1 requests the MME 5 to establish the E-RAB that goes through the LPN 2. In step S203, the MeNB 1 determines whether the E-RAB configuration information has been received from the MME 5 or not. In response to receiving the E-RAB configuration information (YES in step S203), the MeNB 1 transmits the E-RAB configuration information to the LPN 2. In step S205, the MeNB 1 determines whether notification indicating setting completion of the E-RAB (i.e., the S1 bearer and the DRB) has been received from the LPN 2 or not. In response to receiving the E-RAB setting completion notification from the LPN 2 (YES in step S205), the MeNB 1 notifies the UE 3 of the DRB configuration information through the cell 10. In step S207, the MeNB 1 determines whether notification indicating setting completion of the DRB has been received from the UE 3 or not. In response to receiving the DRB setting completion notification from the UE 3 (YES in step S207), the MeNB 1 notifies the MME 5 of the E-RAB setting completion.

Figure 10:
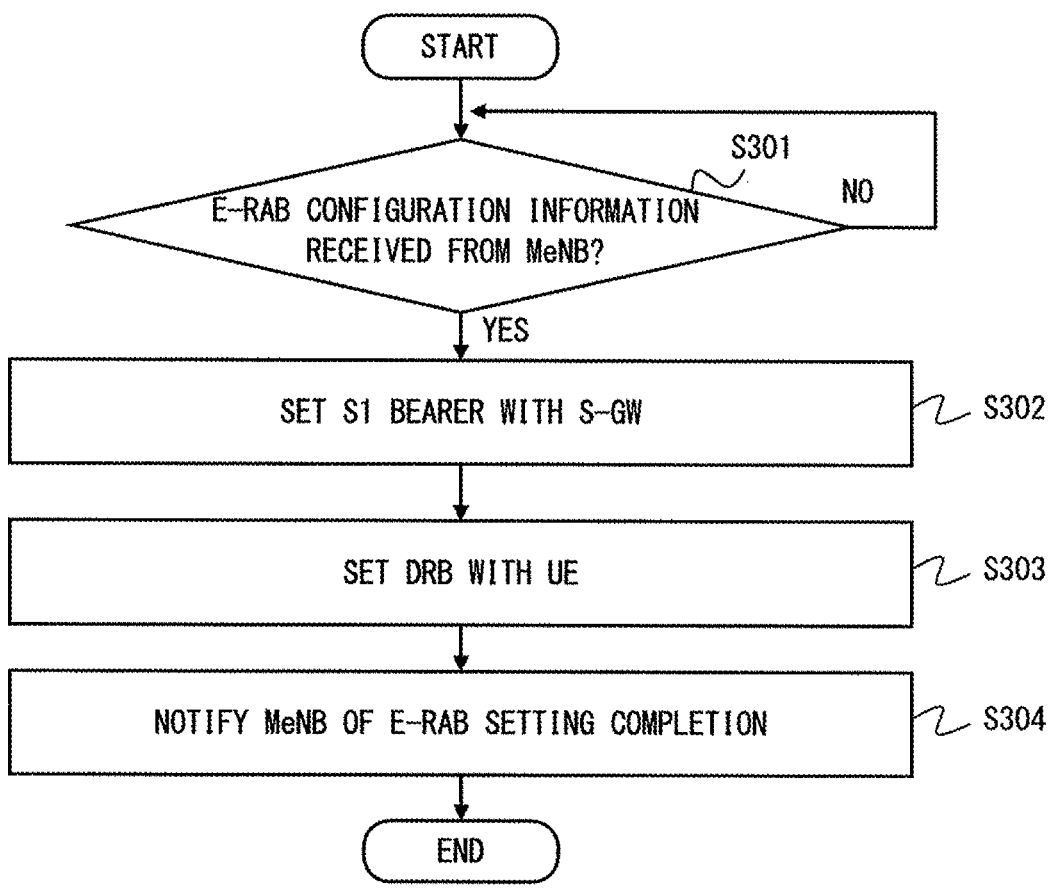
FIG. 10 is a flowchart showing an operation example of the second base station (e.g., an LPN) according to the first embodiment.

FIG. 10 is a flowchart showing an operation example of the LPN 2. In step S301, the LPN 2 (control unit 25) determines whether the E-RAB configuration information has been received from the MeNB 1 or not. In response to receiving the E-RAB configuration information (YES in step S301), the LPN 2 sets the S1 bearer with the S-GW 6 and the DRB with the UE 3 in accordance with the E-RAB configuration information (steps S302 and S303). In step S304, the LPN 2 notifies the MeNB 1 of the E-RAB setting completion.

Figure 11:
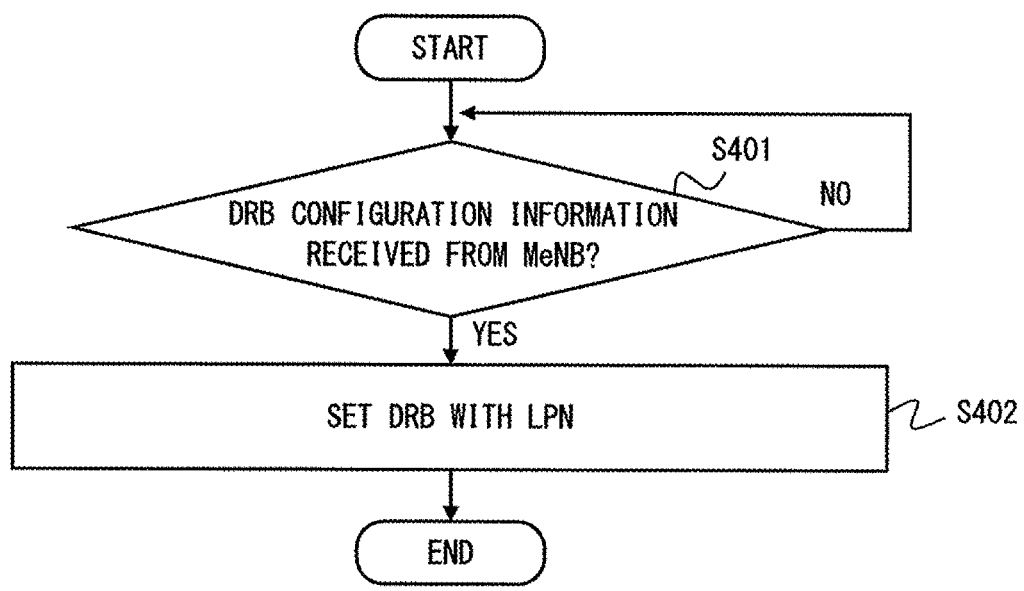
FIG. 11 is a flowchart showing an operation example of the mobile station (e.g., a UE) according to the first embodiment.

FIG. 11 is a flowchart showing an operation example of the UE 3. In step S401, the UE 3 (control unit 35) receives the DRB configuration information from the MeNB 1. In step S402, the UE 3 sets the DRB with the LPN 2 in the cell 20 in accordance with the DRB configuration information.

Figure 12:
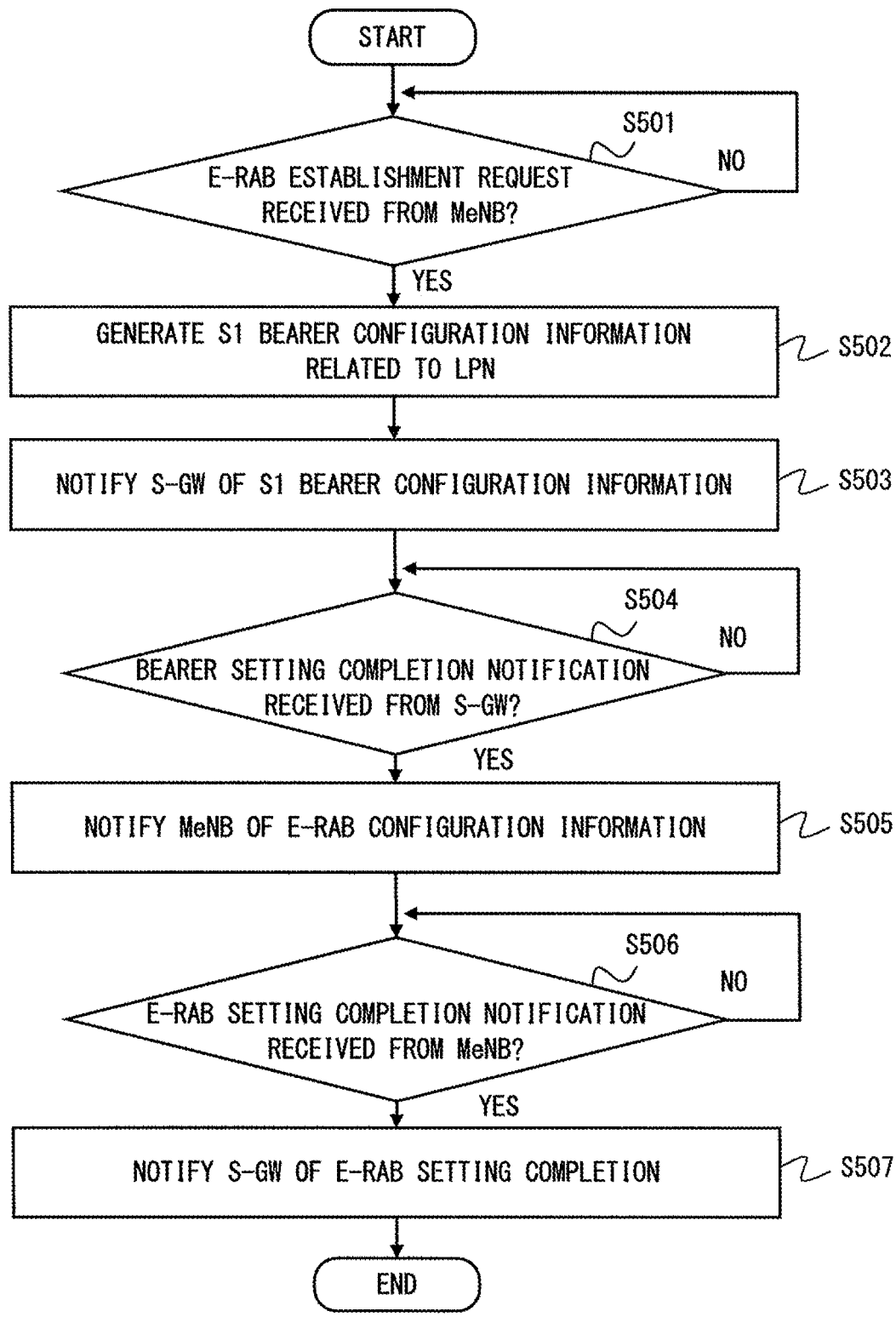
FIG. 12 is a flowchart showing an operation example of the mobility management apparatus (e.g., an MME) according to the first embodiment.

FIG. 12 is a flowchart showing an operation example of the MME 5. In step S501, the MME 5 (bearer setting control unit 52) determines whether the E-RAB setting request has been received from the MeNB 1 or not. In response to receiving the E-RAB setting request (YES in step S501), the MME 5 generates configuration information of an S1 bearer regarding the LPN 2, and notifies the S-GW 6 of the generated configuration information (steps S502 and S503). In step S504, the MME 5 determines whether the bearer setting completion notification has been received from the S-GW 6 or not. In response to receiving the bearer setting completion notification (YES in step S504), the MME 5 notifies the MeNB 1 of the E-RAB configuration information (step S505). In step S506, the MME 5 determines the E-RAB setting completion notification has been received from the MeNB 1 or not. In response to receiving the E-RAB setting completion notification (YES in step S506), the MME 5 notifies the S-GW 6 of E-RAB setting completion (step S507). The E-RAB setting completion notification sent to the S-GW 6 includes configuration information of the LPN 2 (e.g., the address and the TEID of the LPN 2) regarding the S1 bearer between the LPN 2 and the S-GW 6.

Figure 13:
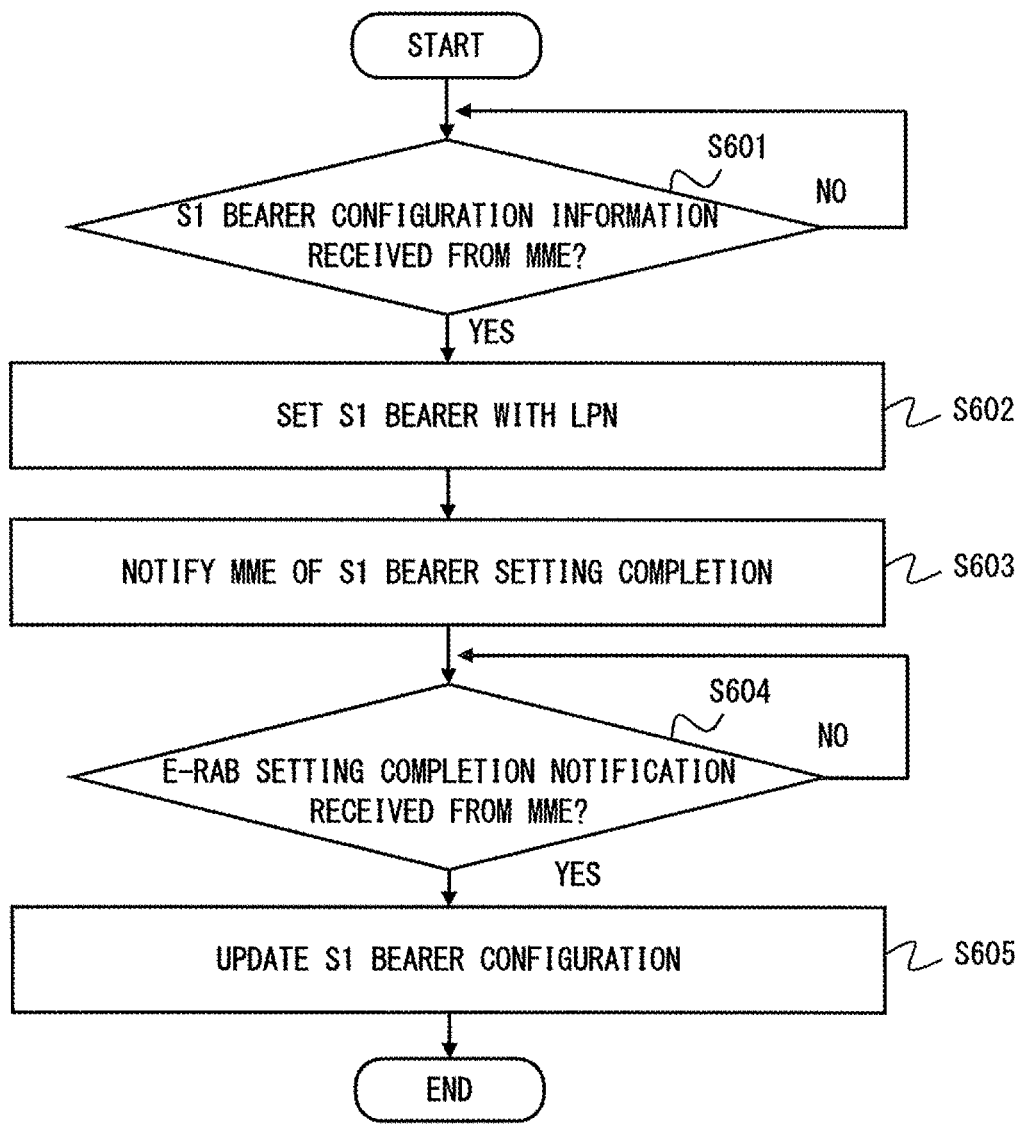
FIG. 13 is a flowchart showing an operation example of the data transfer apparatus (e.g., an S-GW) according to the first embodiment.

FIG. 13 is a flowchart showing an operation example of the S-GW 6. In step S601, the S-GW 6 (bearer control unit 65) determines whether the S1 bearer configuration information has been received from the MME 5 or not. In response to receiving the S1 bearer configuration information (YES in step S601), the S-GW 6 sets the S1 bearer with the LPN 2 in accordance with the S1 bearer configuration information (step S602). In step S603, the S-GW 6 notifies the MME 5 of setting completion of the S1 bearer. The notification includes configuration information of the S-GW 6 (e.g., the address and the TEID of the S-GW 6) regarding the S1 bearer with the LPN 2. In step S604, the S-GW 6 determines whether the E-RAB setting completion notification has been received from the MME 5 or not. In response to receiving the E-RAB setting completion notification (YES in step S604), the S-GW 6 updates (or modifies) the configuration of the S1 bearer with the LPN 2 in accordance with the E-RAB setting completion notification.

Second Embodiment

In this embodiment, a modified example of the bearer architecture explained in the above-mentioned first embodiment will be explained. A configuration example of a radio communication system according to the embodiment may be similar to that shown in FIG. 1.

In the first embodiment described above, the example has been shown where the LPN 2 terminates the S1 bearer for the UE 3 that performs communication in the cell 20. The S1 bearer is the GTP tunnel, and the user data (data packet) is encapsulated within a GTP tunnel packet transferred between the S-GW 6 and the LPN 2. For example, a GTP tunnel packet that encapsulates downlink user data reaches the LPN 2 by being routed and forwarded by a router(s) arranged between the S-GW 6 and the LPN 2. Accordingly, typically, the GTP tunnel packet is transferred without going through the MeNB 1. In this case, the processing load of the MeNB 1 can be reduced since the MeNB 1 need not perform termination processing of the S1 bearer. In addition, since the GTP tunnel packet does not flow through the X2/X3 interface between the MeNB 1 and the LPN 2, performance requirements regarding a capacity of the X2/X3 interface, delay, and the like are relaxed. For example, it also becomes possible to use a non-optical fiber line (e.g., a wireless communication path) for the X2/X3 interface.

In contrast with this, in this embodiment, routing of the GTP tunnel packet is defined in detail. Specifically, in the embodiment, the GTP tunnel packet that encapsulates the user data is transferred between the S-GW 6 and the LPN 2 via the MeNB 1. The MeNB 1 is only required to function as a router (e.g., an Internet Protocol (IP) router) for routing and forwarding the GTP tunnel packet. The routing of the GTP tunnel packet that goes through the MeNB 1 can be achieved by setting of routing tables of the S-GW 6, the LPN 2, and the MeNB 1.

It should be noted that the MeNB 1 need not terminate the S1 bearer. The MeNB 1 is only required to operate as a router that forwards the GTP tunnel packet, and need not perform decapsulation for taking out the encapsulated user packet. Accordingly, increase of the processing load of the MeNB 1 along with GTP tunnel termination does not occur.

It should also be noted that the MeNB 1 can monitor the GTP tunnel packet. For example, the MeNB 1 can monitor a traffic amount of GTP tunnel packets to be transferred. The MeNB 1 can independently estimate a load of the LPN 2 or a load of the cell 20 by observing the traffic amount of the GTP tunnel packets. Accordingly, the MeNB 1 according to the embodiment can determine deactivation of the E-RAB, which goes through the LPN 2, or deactivation of the cell 20 (step S110 of FIG. 8), based on the traffic amount of the GTP tunnel packets that the MeNB 1 itself has monitored.

Figure 14:
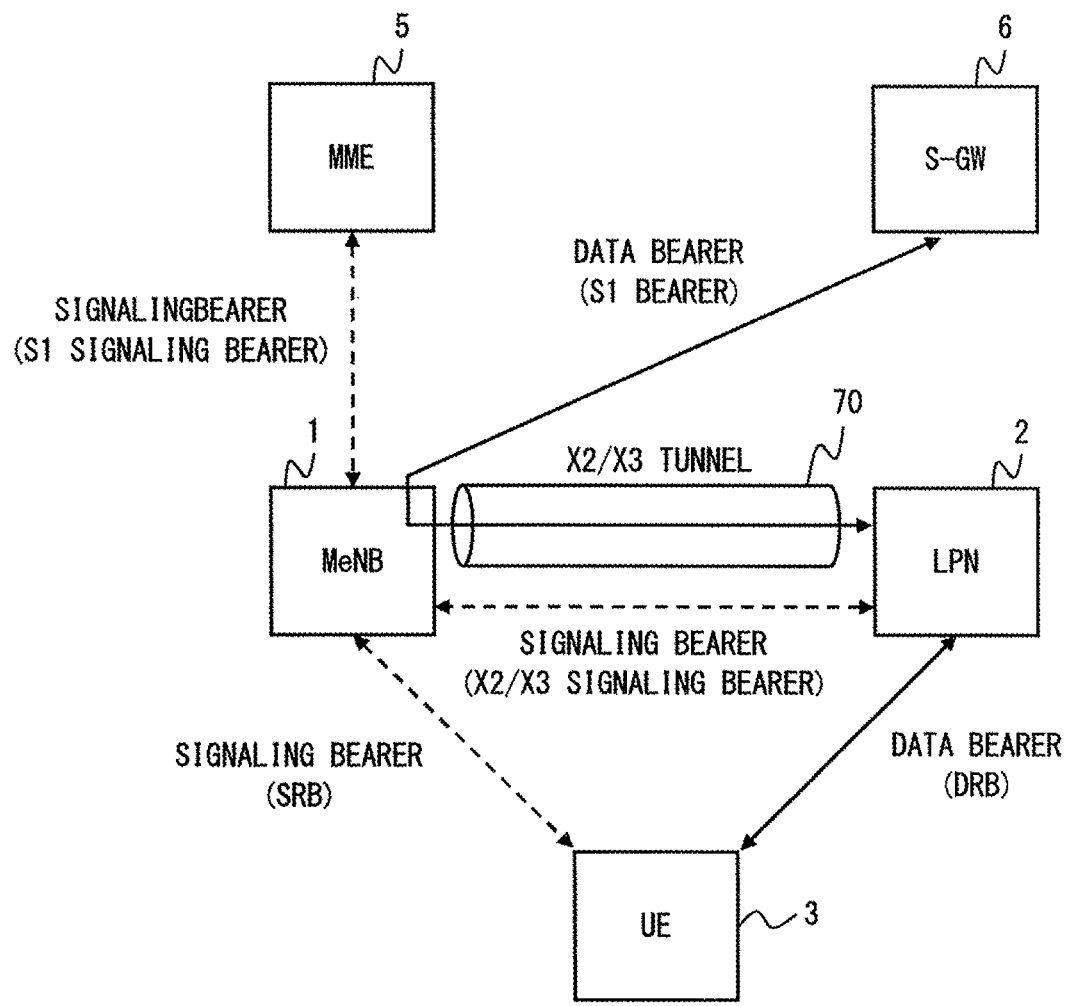
FIG. 14 is a diagram showing bearer architecture in a radio communication system according to a second embodiment.

FIG. 14 is a diagram showing one example of bearer architecture according to the embodiment. In the example of FIG. 14, the MeNB 1 and the LPN 2 set a tunnel 70 (e.g., a GTP tunnel) on the X2/X3 interface. The MeNB 1 further encapsulates the GTP tunnel packet, which has encapsulated the user data for the S1 bearer between the S-GW 6 and the LPN 2, and transfers the encapsulated GTP tunnel packet through the tunnel 70. Note that the tunnel 70 may not be set. That is, the MeNB 1 may transfer the GTP tunnel packet without further encapsulating it.

Figure 15:
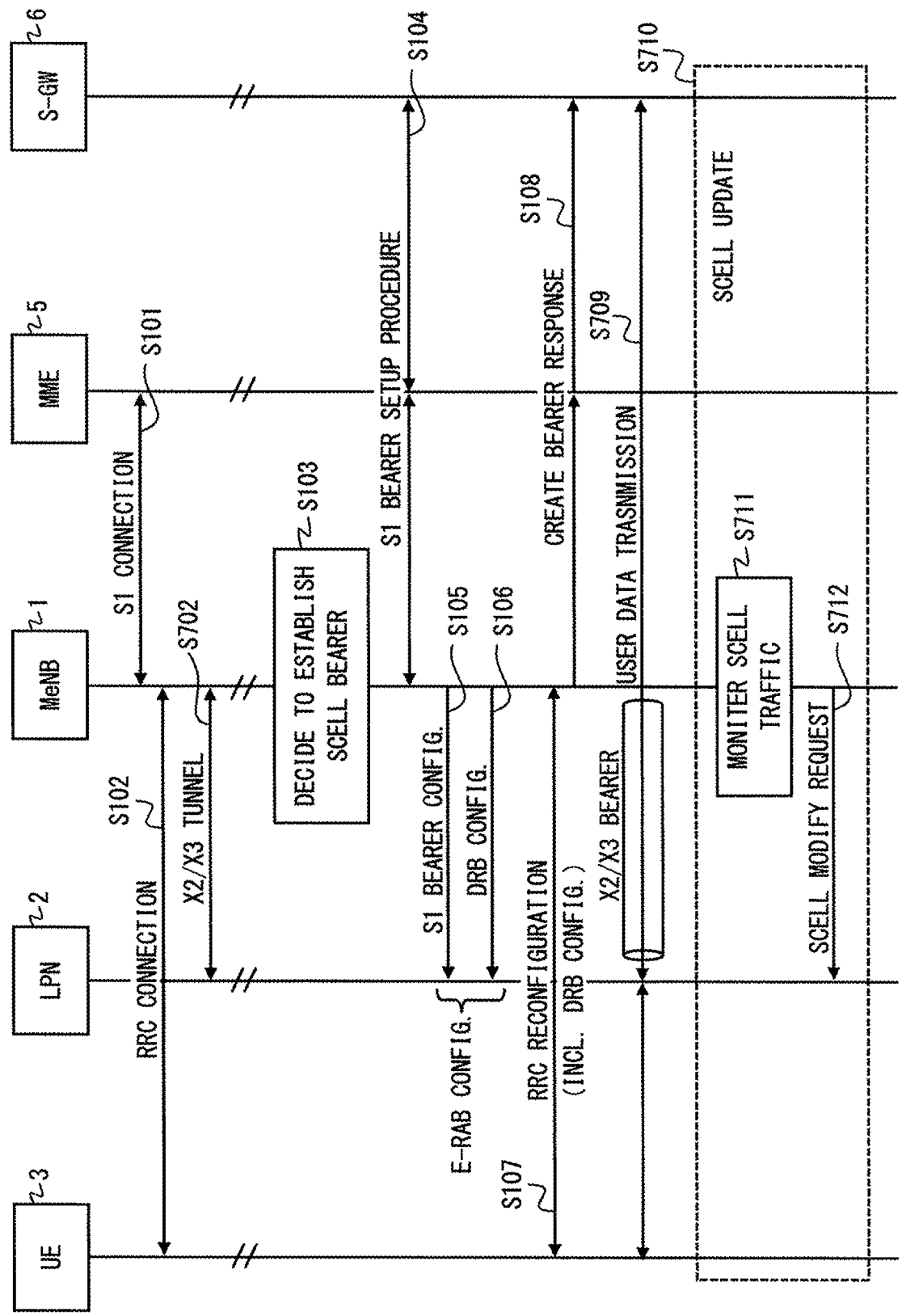
FIG. 15 is a sequence diagram showing an establishment procedure of data bearers according to the second embodiment.

FIG. 15 is a sequence diagram showing an establishment procedure of data bearers according to this embodiment. As is apparent from comparison of FIGS. 8 and 15, the bearer establishment procedure in this embodiment is similar to that in the first embodiment. This is because the termination points of the S1 bearer are the S-GW 6 and the LPN 2 identical with the first embodiment. Accordingly, processes in steps S101 to S108 of FIG. 15 are similar to those in steps S101 to S108 of FIG. 8. In step S702 of FIG. 15, the MeNB 1 and the LPN 2 establish the tunnel 70 on the X2/X3 interface. As mentioned above, however, the tunnel 70 may not be established. In step S709, the GTP tunnel packet is transferred between the S-GW 6 and the LPN 2 via the MeNB 1. In the examples of FIGS. 14 and 15, the GTP tunnel packet is transferred through the tunnel 70 on the X2/X3 interface.

Step S710 of FIG. 15 shows an update procedure of the secondary cell (i.e., the cell 20) similarly to step S110 of FIG. 8. For example, the MeNB 1 may deactivate the E-RAB (i.e., the DRB and the S1 bearer) for each UE 3 that goes through the LPN 2 or may stop utilizing the cell 20 based on a utilization status (a total traffic amount, the number of connected UEs, or the like) of the cell 20, a traffic amount (user data amount) for each UE 3 that is using the cell 20, or the combination thereof. In the example shown in FIG. 15, the MeNB 1 monitors the traffic amount of the GTP tunnel packets that the MeNB 1 itself transfers (i.e., a traffic amount of the cell 20) (step S711). Additionally, in step S712, the MeNB 1 requests update (or modification) of the cell 20 based on the monitored traffic amount (the SCell Modify Request).

Third Embodiment

In this embodiment, a modification of the first and second embodiments will be explained. A configuration example of a radio communication system according to the embodiment may be similar to that shown in FIG. 1. The MeNB 1 according to the embodiment is configured to determine which of the cells 10 and 20 is used for transfer of the user data regarding the UE 3, and to request establishment of the S1 bearer and the DRB that go through the LPN 2 in response to determination of use of the cell 20. For example, the MeNB 1 may determine the use of the cell 20 when a predetermined condition is satisfied. For example, the predetermined condition relates to at least one of bearer priority, a delay amount allowed to the user data of the UE 3, a load of the LPN 2, radio quality of the LPN 2, a positional relation between the UE 3 and the LPN 2, and mobility of the UE 3. Specific examples of conditions for determining the use of the cell 20 will be explained below.

In a first example, the predetermined condition relates to the bearer priority. The MeNB 1 may determine to use the cell 10 of the MeNB 1 for transferring the user data of the UE 3 when the bearer priority is higher than a reference value, and may determine to use the cell 20 of the LPN 2 for transferring the user data of the UE 3 when the bearer priority is lower than the reference value.

In a second example, the predetermined condition relates to the delay amount allowed to the user data of the UE 3. The MeNB 1 may determine to use the cell 10 for transferring the user data of the UE 3 when the allowed delay amount is smaller than a reference value, and may determine to use the cell 20 for transferring the user data of the UE 3 when the allowed delay amount is larger than the reference value.

In a third example, the predetermined condition relates to the load of the LPN 2. The MeNB 1 may determine to use the cell 10 for transferring the user data of the UE 3 when the load of the LPN 2 is larger than a reference value, and may determine to use the cell 20 for transferring the user data of the UE 3 when the load of the LPN 2 is smaller than the reference value. For example, a resource usage amount, a resource usage rate, or a traffic amount of the user data may be used for the load of the LPN 2. The MeNB 1 may periodically or aperiodically collect the load of the LPN 2 from the LPN 2. Alternatively, the LPN 2 may periodically notify the MeNB 1 of the load of the LPN 2, or may aperiodically notify the MeNB 1 of the load of the LPN 2 according to the load exceeding the reference value.

In a fourth example, the predetermined condition relates to the radio quality of the LPN 2. The MeNB 1 may determine to use the cell 10 for transferring the user data of the UE 3 when the radio quality of the LPN 2 is lower than a reference value, and may determine to use the cell 20 for transferring the user data of the UE 3 when the radio quality of the LPN 2 is higher than the reference value. For example, Reference Signal Received Power (RSRP) or Reference Signal Received Quality (RSRQ) of the LPN 2 may be used for the radio quality of the LPN 2. The radio quality of the LPN 2 may be measured by the UE 3, and may be reported from the UE 3 to the MeNB 1.

In a fifth example, the predetermined condition relates to the positional relation between the UE 3 and the LPN 2. The MeNB 1 may determine to use the cell 10 for transferring the user data of the UE 3 when an evaluation value indicating a distance between the LPN 2 and the UE 3 is larger than a reference value, and may determine to use the cell 20 for transferring the user data of the UE 3 when the evaluation value is smaller than the reference value. In this case, the MeNB 1 may manage position information of the LPN 2, and may acquire position information of the UE 3. The position information of the LPN 2 and the UE 3, for example, may be Global Positioning System (GPS) information.

In a sixth example, the predetermined condition relates to the mobility of the UE 3. The MeNB 1 may determine to use the cell 10 for transferring the user data of the UE 3 when an evaluation value indicating the mobility of the UE 3 is higher than a reference value, and may determine to use the cell 20 for transferring the user data of the UE 3 when the evaluation value is lower than the reference value. The evaluation value indicating the mobility of the UE 3 may be an average moving speed calculated from the position information (e.g., the GPS information) of the UE 3. Alternatively, the evaluation value indicating the mobility of the UE 3 may be a cell stay time of the UE 3, or a handover frequency of the UE 3, and the like. The cell stay time of the UE 3 and the handover frequency of the UE 3 are related to the mobility of the UE 3. That is, this is because when the UE 3 has high mobility, it is considered that an average cell stay time of the UE 3 becomes short, and that the handover frequency of the UE 3 becomes high.

Figure 16:
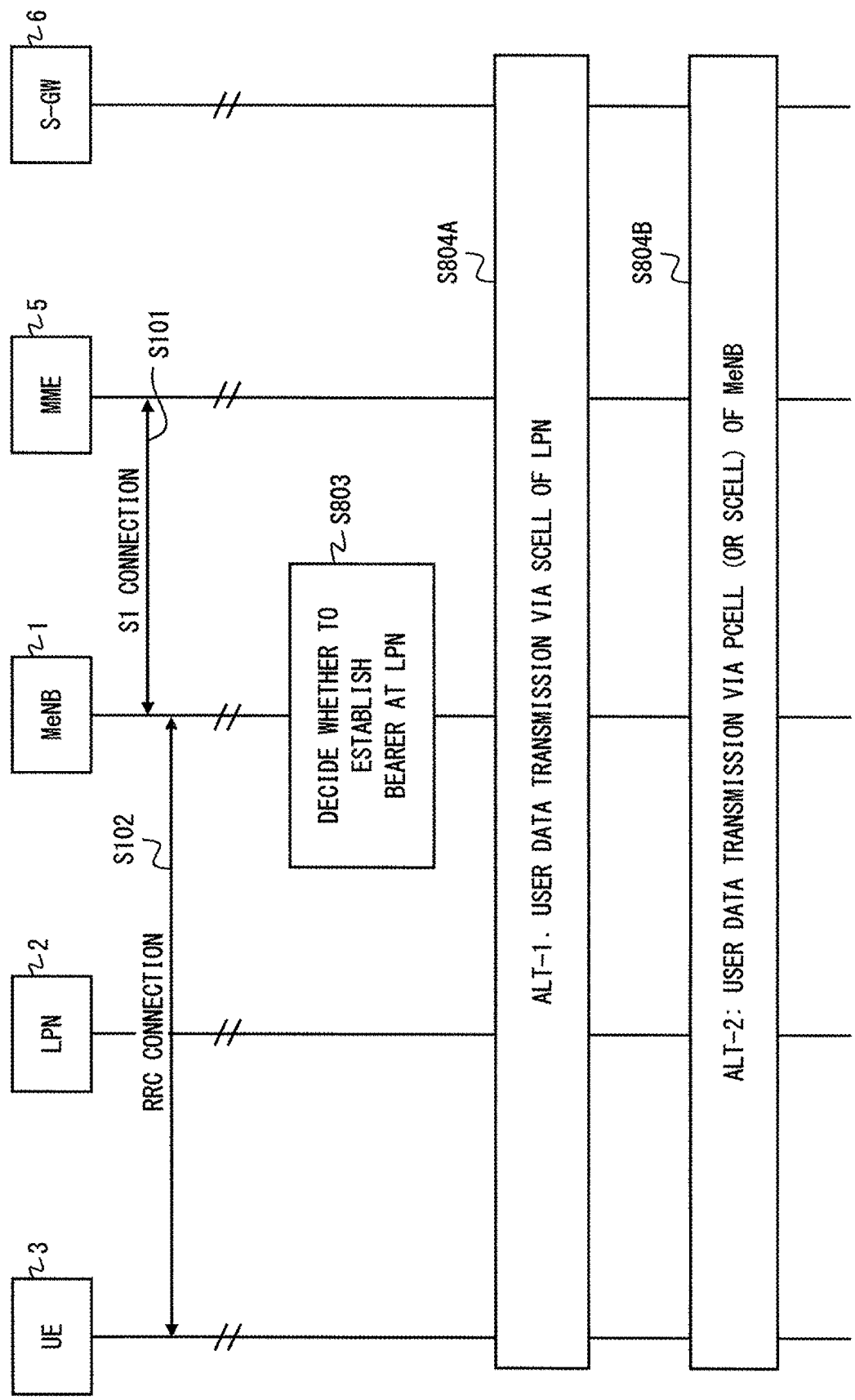
FIG. 16 is a sequence diagram showing an establishment procedure of data bearers according to a third embodiment.

FIG. 16 is a sequence diagram showing an establishment procedure of data bearers according to the embodiment. Processes in steps S101 and S102 of FIG. 16 are similar to those in steps S101 and S102 of FIG. 8. In step S803, the MeNB 1 determines which of the MeNB 1 (cell 10) and the LPN 2 (cell 20) the data bearer for the UE 3 is set to. The specific examples of the conditions for determining the cell 20 of the LPN 2 are as mentioned above.

Step S804A or S804B is alternatively executed according to the determination in step S803. Specifically, in response to determining the use of the cell 20 (secondary cell), the MeNB 1 requests the MME 5 to establish an S1 bearer and a DRB that go through the LPN 2, and performs signaling with the UE 3 and the LPN 2. An establishment procedure of the S1 bearer and the DRB, which go through the LPN 2, may be similar to the procedure explained in the first or second embodiment. As a result of this, the S1 bearer and the DRB that go through the LPN 2 are established. The UE 3 transmits and receives user data via the cell 20 of the LPN 2 (step S804A). Meanwhile, in response to determining the use of the cell 10 (primary cell), the MeNB 1 requests the MME 5 to establish an S1 bearer and a DRB that go through the MeNB 1. As a result of this, the S1 bearer and the DRB that go through the MeNB 1 are established. The UE 3 transmits and receives user data via the cell 10 of the MeNB 1 (step S804B).

According to the embodiment, for example, an effect mentioned hereinafter can be obtained. When the LPN 2 is used, it is expected that handover/data bearer switching of the UE 3 to other cell (e.g., an MeNB cell or an LPN cell) frequently occurs due to smallness of coverage of the cell 20. Accordingly, when a data bearer is set to the LPN 2, some requirements, such as latency, throughput, or data loss may not be satisfied. This means that a data bearer set to the LPN 2 is not suitable for particular services (e.g., Voice over IP (VoIP), on-line gaming, or the like) needing a low latency or small data loss, or the like. In addition, other factors, such as the load of the LPN 2, the radio quality of the LPN 2, and the mobility of the UE 3 may also cause trouble in utilizing the LPN 2.

In the embodiment, the MeNB 1 determines a situation, a service characteristic, a characteristic of the UE 3, or the like that are unsuitable for utilization of the LPN 2, and uses the cell 10 of the MeNB 1 when they are not suitable for the utilization of the LPN 2. Accordingly, in the embodiment, the MeNB 1 can appropriately control whether to utilize the LPN 2.

Other Embodiments

The third embodiment described above can be applied to a radio communication system having bearer architecture different from the bearer architecture explained in the first and second embodiments. For example, the third embodiment may be applied to architecture in which the S1 bearer for transferring the user data of the UE 3 via the cell 20 and the LPN 2 is terminated in the MeNB 1. That is, the processing and the operation of the MeNB 1 explained in the third embodiment, in which the MeNB 1 determines a situation, a service characteristic, a characteristic of the UE 3, or the like that are unsuitable for the utilization of the LPN 2, and in which the MeNB 1 uses the cell 10 of the MeNB 1 when they are not suitable for the utilization of the LPN 2, are not dependent on the bearer architecture.

The control methods regarding bearer establishment performed by the MeNB 1 (control unit 15), the LPN 2 (control unit 25), the UE 3 (control unit 35), the MME 5 (bearer setting control unit 52), and the S-GW 6 (bearer control unit 65) each may be implemented by using a semiconductor processing device including an Application Specific Integrated Circuit (ASIC), the control methods having been mentioned in the first to third embodiments. Alternatively, the processing may be implemented by causing a computer system including at least one processor (e.g., a microprocessor, a Micro Processing Unit (MPU) or a Digital Signal Processor (DSP)) to execute a program. More specifically, one or more programs including instructions for causing a computer system to perform the algorithms explained with reference to the flowcharts and sequence diagrams may be created and supplied to a computer system.

This program can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g., magneto-optical disks), CD-ROM (Read Only Memory), CD-R, CD-R/W, and semiconductor memories (such as mask ROM, PROM (Programmable ROM), EPROM (Erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer through a wired communication line (e.g., electric wires, and optical fibers) or a wireless communication line.

The above-mentioned first to third embodiments may be appropriately combined.

In the above-mentioned first to third embodiments, the LTE system has been mainly explained. However, these embodiments may be applied to radio communication systems other than the LTE system, for example, a 3GPP Universal Mobile Telecommunications System (UMTS), a 3GPP2 CDMA2000 system (1×RTT, High Rate Packet Data (HRPD)), a Global System for Mobile Communications (GSM) system, or a WiMAX system.

Furthermore, the embodiments stated above are merely examples of application of the technical ideas obtained by the present inventor. Needless to say, these technical ideas are not limited to those described in the above embodiments and may be changed in various ways.

This application is based upon and claims the benefit of priority from Japanese Patent Application No. 2012-223176 filed on Oct. 5, 2012, and the disclosure of which is incorporated herein in its entirety by reference.

REFERENCE SIGNS LIST

1 BASE STATION (MeNB)
2 BASE STATION (LPN)
3 MOBILE STATION (UE)
4 CORE NETWORK (EPC)
5 MOBILITY MANAGEMENT APPARATUS (MME)
6 DATA TRANSFER APPARATUS (S-GW)
15 CONTROL UNIT
25 CONTROL UNIT
35 CONTROL UNIT
52 BEARER SETTING CONTROL UNIT
65 BEARER CONTROL UNIT
70 TUNNEL

The invention claimed is:

1. A first base station comprising:
a transmission interface configured to transmit, to a second base station, a first message for requesting the second base station to configure a user plane interface for a user equipment (UE) established between the second base station and a data transfer apparatus; and
a reception interface configured to receive a first response for the first message, wherein
the transmission interface is further configured to transmit, to a mobility management apparatus, via a control plane interface for the UE established between the first base station and the mobility management apparatus, a second message including a Tunnel Endpoint Identifier (TEID) of the user plane interface.

2. The first base station according to claim 1, wherein the transmission interface is further configured to transmit, to the UE, a third message related to a Radio Resource Control (RRC) Connection Reconfiguration after the first response is received.

3. The first base station according to claim 2, wherein the reception interface is further configured to receive a second response for the third message.

4. The first base station according to claim 1, wherein
the control plane interface is an S1-MME interface for the UE and is terminated in the first base station, and
the user plane interface is an S1-U interface for the UE and is terminated in the second base station.

5. The first base station according to claim 4, wherein the S1-MME interface and the S1-U interface are used simultaneously.

6. The first base station according to claim 1, wherein the transmission interface is further configured to transmit, to the second base station, a fourth message related to a second base station modification request.

7. A communication control method in a first base station, the method comprising:
transmitting, to a second base station, a first message for requesting the second base station to configure a user plane interface for a user equipment (UE) established between the second base station and a data transfer apparatus;
receiving a first response for the first message; and
transmitting, to a mobility management apparatus, via a control plane interface for the UE established between the first base station and the mobility management apparatus, a second message including a Tunnel Endpoint Identifier (TEID) of the user plane interface.

8. The method according to claim 7, further comprising transmitting, to the UE, a third message related to a Radio Resource Control (RRC) Connection Reconfiguration after the first response is received.

9. The method according to claim 8, further comprising receiving a second response for the third message.

10. The method according to claim 7, wherein
the control plane interface is an S1-MME interface for the UE and is terminated in the first base station, and
the user plane interface is an S1-U interface for the UE and is terminated in the second base station.

11. The method according to claim 10, wherein the S1-MME interface and the S1-U interface are used simultaneously.

12. The method according to claim 7, further comprising transmitting, to the second base station, a fourth message related to a second base station modification request.

13. A radio communication system comprising:
a user equipment (UE);
a first base station;
a second base station; and
a mobility management apparatus, wherein
the first base station is configured to transmit, to the second base station, a first message for requesting the second base station to configure a user plane interface for the UE established between the second base station and a data transfer apparatus,
the second base station is configured to transmit a first response for the first message, and
the first base station is further configured to transmit, to the mobility management apparatus, via a control plane interface for the UE established between the first base station and the mobility management apparatus, a second message including a Tunnel Endpoint Identifier (TEID) of the user plane interface.

14. The radio communication system according to claim 13, wherein
the first base station is further configured to transmit, to the UE, a third message related to a Radio Resource Control (RRC) Connection Reconfiguration after the first response is received.

15. The radio communication system according to claim 14, wherein the UE is configured to transmit a second response for the third message.

16. The radio communication system according to claim 13, wherein
the control plane interface is an S1-MME interface for the UE and is terminated in the first base station, and
the user plane interface is an S1-U interface for the UE and is terminated in the second base station.

17. The radio communication system according to claim 1, wherein the S1-MME interface and the S1-U interface are used simultaneously.

18. The radio communication system according to claim 13, wherein the first base station is further configured to transmit, to the second base station, a fourth message related to a second base station modification request.

19. The radio communication system according to claim 13, wherein the UE comprises:
a radio communication unit; and
a control unit configured to receive configuration information of the user plane interface from the first base station, and to control the radio communication unit so as to receive or transmit user data through a second cell served by the second base station.

* * * * *